US005439516A

United States Patent [19]

Tanabe et al.

[11] Patent Number: 5,439,516

[45] **Date of Patent: * Aug. 8, 1995**

[54] HEAT SENSITIVE COLOR DEVELOPING MATERIAL

[75] Inventors: Hisake Tanabe, Kiyoto; Shingi Nakano; Yasuhiko Nakae, both of Osaka; Satoshi Urano, Kyoto; Yoshio Eguchi, Osaka, all of Japan

[73] Assignee: Nippon Paint Co., Ltd., Osaka, Japan

[ * ] Notice: The portion of the term of this patent subsequent to Jul. 20, 2010 has been disclaimed.

[21] Appl. No.: 175,692

[22] Filed: Dec. 30, 1993

Related U.S. Application Data

[63] Continuation-in-part of Ser. No. 727,671, Jul. 9, 1991, abandoned.

[30] Foreign Application Priority Data

Jul. 9, 1990 [JP] Japan .................................. 2-181878

[51] Int. Cl.$^6$ .............................................. C09D 11/00

[52] U.S. Cl. ................................ 106/21 R; 106/21 A

[58] Field of Search ........................... 106/21 R, 21 A; 503/218, 219, 216, 217

[56] References Cited

U.S. PATENT DOCUMENTS

| | | | |
|---|---|---|---|
| 3,916,068 | 10/1975 | Kohmura et al. | 427/148 |
| 5,288,686 | 2/1994 | Tanabe et al. | 106/21 A |
| 5,302,194 | 4/1994 | Tanabe et al. | 106/21 A |

FOREIGN PATENT DOCUMENTS

| | | |
|---|---|---|
| 294088 | 11/1989 | Japan . |
| 171293 | 7/1990 | Japan . |

*Primary Examiner*—Helene Klemanski
*Attorney, Agent, or Firm*—Vineet Kohli; Thomas R. Morrison

[57] ABSTRACT

A heat sensitive color developing material containing an electron donating color forming organic compound, a heat activating compound, and a color developer. This material exhibits excellent heat sensitivity and enables rapid color development at low cost.

13 Claims, No Drawings

HEAT SENSITIVE COLOR DEVELOPING MATERIAL

This application is a Continuation in Part application of application Ser. No. 07/727,671 filed on Jul. 9, 1991, now abandoned.

BACKGROUND OF THE INVENTION

The present invention relates to a color developing material, and more particularly to a heat sensitive color developing material which has numerous applications including being used as a recording material.

The heat sensitive color developing material of the present invention is able to develop color at lower temperatures and can be manufactured at low cost when compared to prior art color developing materials.

Conventional heat sensitive color developing materials are usually produced by dispersing an electron donating color forming organic compound and a phenolic compound, as a color developer, into a binder in high concentrations, and then coating it onto paper. As soon as the phenolic compound is fused by heating, a phenolic hydroxyl group allows the electron donating compound to develop color.

However, conventional heat sensitive color developing materials have numerous disadvantages.

Chief among them is the development of color, prior to heating. Generally, when a prior art color developing material is mixed with an electron donating organic compound, it begins to develop color immediately, prior to being heated. This property is based upon the high solubility of the phenolic compound in an organic solvent. This feature makes it impractical to dissolve and mix the color developing materials with each other.

Additionally, it is difficult to uniformly disperse the electron donating organic compound and the phenolic compound into a binder, to wit: in a finely divided form (less than one micron).

Suitable heat sensitivity at a given temperature is maintained by adjusting the melting point of the phenolic compound. Phenolic compounds that can be used to adjust the heat sensitivity are limited in number. Thus suitable heat sensitivity at a given temperature is limited to those phenolic compounds.

In an attempt to overcome the aforementioned problems, Japanese Laid Open Patent Application Publication No. 62-263525 provides for a heat sensitive color developing material using a compound or resin containing a neutral t-butyl ester as the electron donating compound, such as, a leuco compound.

When one of a compound and resin containing the neutral t-butyl ester radical is heated to a temperatures of 200° C. or higher, it decomposes rapidly into carboxylic acid and isobutane. Due to the presence of the carboxylic acid, the leuco begins to develop color. This feature results in an improvement in conventional heat sensitive color developing materials using phenolic compounds as color developing agents.

Japanese Patent Application Publication No. 63-32637 also attempts to overcome the aforementioned disadvantages by proposing a color developer which is resolvable at lower temperatures. This feature was thought to provide a heat sensitive color developing material which is able to develop color at a lower temperature.

The present invention attempts at overcoming the aforementioned problems associated with prior art heat sensitive color developing materials.

OBJECTS AND SUMMARY OF THE INVENTION

Accordingly, it is an object of the present invention to provide a heat sensitive color developing material which exhibits excellent heat sensitivity, and allows rapid color development at low cost.

It is a further object of the present invention to provide a heat sensitive color developing material with excellent heat sensitivity, in which color can be developed rapidly when it is heated at a relatively low temperature.

It is a still further object of the present invention to provide color development of an electron donating color organic compound even when the organic compound is mixed therewith.

Briefly stated, the present invention provides for a heat sensitive color developing material containing an electron donating color forming organic compound, a heat activating compound, and a color developer. This material exhibits excellent heat sensitivity, and enables rapid color development at low cost.

According to an embodiment of the invention, there is provided a heat sensitive color developing material comprising:

(A) an electron donating color forming organic compound;

(B) a heat activating compound wherein the heat activating compound is at least one selected from the group consisting of compounds I and II:

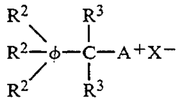

I $R^2$ is independently selected from the group consisting of —COR, —R', —OH, —CN, and an amino radical, $R^3$ is independently selected from the group consisting of H, —R, and a halogen atom, A is at least one selected from the group consisting of

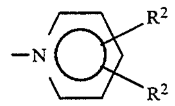

and

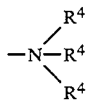

$R^4$ is independently selected from the group consisting of alkyl, alkenyl, and alkenyl substituted by a group selected from the group consisting of hydroxy, carboxy, nitro, cyano, alkoxy of 1–4 carbon atoms, alkanoyloxy of 1 to 4 carbon atoms, phenyl, and phenyl substituted by a group selected from the group consisting of halogen, nitro, cyano, $—NR^2$, —R, and —OR, R is selected from the group consisting of an alkyl radical of 1 to 4 carbon atoms and a cycloalkyl radical, R' is selected from the group consisting of H, —R, —OR, a halogen atom and a nitro group, X is selected from the group consisting of $AsF_6^-$, $SbF_6^-$, $BF_4^-$, $BF_6^-$, $PF_6^-$, $ClO_4^-$, $FeCl_4^-$, $CF_3SO_3^-$, $RSO3^-$, and RCOO—;

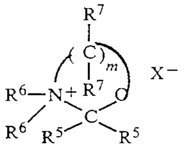 II $R^5$ is independently selected from the group consisting of H, —R, an alkenyl radical of 2 to 3 carbon atoms and $R^8$, $R^6$ is independently selected from the group consisting of —R, an alkenyl radical of 2 to 3 carbon atoms and $R^8$, $R^7$ is independently selected from the group consisting of H, OH, —R, —OR, and —$R^8$, —$R^8$ is at least one selected from the group consisting of a phenyl radical, and a phenyl radical substituted by a group selected from the group consisting of a halogen atom, hydroxy, nitro, cyano, —NHR, —R, and —OR, m is an integer of 1 to 4 and R and X are as defined above.

The above, and other objects, features and advantages of the present invention will become apparent from the following description.

DETAILED DESCRIPTION OF THE PREFERRED EMBODIMENT

According to the present invention, the heat sensitive color developing material which includes an electron donating color forming organic compound, a heat activating compound, and a compound containing t-butylester is dispersed in a film forming macromolecular substance. The resultory product, can be coated on paper, and similar surfaces.

Even though, the above compounds are all dissolved and mixed with a film forming macromolecular substance, there is no color development, in the absence of heat. This feature makes it easier to coat paper and similar surfaces with the heat sensitive color developing material of the present invention.

According to the present invention, rapid color development can be achieved at low temperatures with the addition of a small amount of a heat activator compound. This feature, substantially reduces the overall cost of manufacturing the heat sensitive color developing material of the present invention.

Additionally, the need for using a film forming macromolecular substance may be eliminated by the use of a resin compound with film forming properties, having a t-butylester group.

Preferably, A is

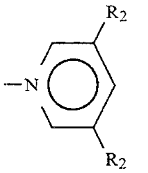

at least one of $R^3$ is other than H, $R^4$ is independently selected from the group consisting of an alkyl and alkenyl which may be substituted by hydroxy, carboxy, nitro, cyano, alkoxy and alkanoyloxy of 1 to 4 carbon atoms, and/or phenyl which may be substituted by at least one of halogen, nitro, cyano, —$NR^2$, —R, and —OR, R is at least one selected from the group consisting of an alkyl radical of 1 to 4 carbon atoms and a cycloalkyl radical, R′ is selected from the group consisting of H, —R, —OR, a halogen atom and a nitro group, X is at least one selected from the group consisting of $AsF_6^-$, $SbF_6^-$, $BF_4^-$, $BF_6^-$, $PF_6^-$, $ClO_4^-$, $FeCl_4^-$, $CF_3SO_3^-$, $RSO_3^-$, RCOO_, and compound II having the following formula:

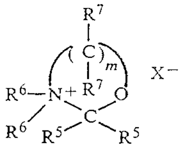 II wherein $R^5$ is independently selected from the group consisting of H, —R, an alkenyl radical II, having 2 to 3 carbon atoms and $R^8$, $R^6$ is at least one independently selected from the group consisting of —R, an alkenyl radical of 2 to 3 carbon atoms and $R^8$, $R^7$ is at least one independently selected from the group consisting of H, OH, —R, OR and $R^8$, $R^8$ represents a phenyl radical which may be substituted by at least one selected from the group consisting of a halogen atom, hydroxy, nitro, cyano, —NHR, —R and —OR, m is an integer of 1 to 4 and R and X are as defined above.

Further, the heat sensitive color developing material may contain a color developer (C) which includes a compound of a t-butylester radical which is selected from the group consisting of a t-butylester of aliphatic carboxylic acid of 3 to 18 carbon atoms, having a higher boiling point than the thermal decomposition temperature of the heat activating compound (B), a t-butylester of a carboxylic acid of 6 to 10 carbon atoms, a t-butylester of a heterocyclic carboxylic acid of 3 to 6 carbon atoms and a film forming macromolecular substance an average molecular weight of about 500 to 50,000 and containing a t-butylester radical side chain.

The electron donating color developing organic compound (A) is one of a colorless and light color compound. When the electron is removed by i.e., oxidation, it changes to a dark color compound, which may be a leuco dye which is normally used for the heat sensitive recording material.

The leuco dye is at least one selected from the group consisting of triphenyl methane phthalide, fluoran, phenothazine, indolyl phthalide, leucoauramine, rhodamine lactone, indoline, triphenyl methane, araphthalimide, chromenoindole and triazine.

Preferably, these compounds are selected from crystal violet lactone, 3,3-bis(p-dimethylaminophenyl)-6-dimethylaminophthalide; 3,3-bis(p-dimethylaminophenyl) phthalide; 3-(p-dimethylaminophenyl)-3-(1,2-methylindole-3-ile) phthalide; 3-(p-dimethylaminophenyl)-3-(2-methlyindole-3-il) phthalide; 3-(p-diethylaminophenyl)-3-(1-ethyl-2-methylindole-3-il)phthalide; 3-(p-dimethylaminophenyl)-3-(2-phenylindone-3-ile) phthalide; 3,3-bis-(1,2-dimethylindone-3-ile)-5-dimethylaminophthalide; 3,3-bis-(dimethylindone-3-ile)-6-dimethylphthalide; 3,3-bis-(1-n-butyl-2-methylindone-3-ile) phthalide; 3,3-bis-(9-ethylcarbazole-3-ile)-5-dimethylaminophthalide; 3,3-bis-(2-phenylindole-3-ile)-5-dimethylaminophthalide-3-p-dimethylaminophenyr-3-(1-methylpyrole-2-ile)-6-dimethylaminophthalide; 4-4[1]-bis-dimethylaminobenzlhydolinebenzylethyl; N-halophenylleucoauramine; N-2,4,5,-trichlorophenylleucoauramine; rhoadamine-(p-nitroanilino) lactam; 3-dimethylamino-6-methoxyfluoran; 3-diethylamino-7-meyhoxyfluoran3-diethylamino-7-chloro-6-methylfluoran; 3-diethylamino-7-(acetylmethylamino) fluoran; 3-diethylamino-7(dibenzylamino) fluoran; 3-diethylamino-7-(chloroethylmethylamino) fluoran; 3-dibutylamino-6-methyl-7-anilino fluoran; benzoylleucomethylene blue-3,7-bis(dimethylamino)-10-benzoylphenotriazine; p-nitrobenzylleucomethylene blue; 3-methyl-spiro-dinaphtopyrane; 3-ethylspiro-dinaphtopyrane; 3,3[1]-dichloro-spiro-dinaphtopyrane; 3-benzyl-spiro-dinaphtoprane; 3-methyl-naphto-(3-methoxybenzo)-spiropyrane and similar substances.

By heating the heat activating compound (B) of the present invention, the color developer (C), which will be described hereinafter, produces color. However, color can also be produced by heating the heat activating compound (B) alone.

Such a heat activating compound (B) has been described according to formula I to II supra. The aromatic ammonium organic acid salts of formula I may be depicted as follows:

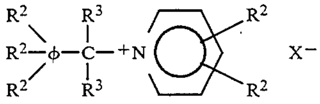

I-1 wherein $R^2$, $R^3$ and X are as defined above, and $R^3$ and $R^3$ may be the same or different, and

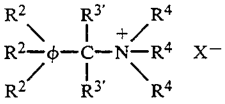

I-2 wherein $R^3$ is H, —R or a halogen atom, $R^2$ and $R^4$, are as defined above, and $R^2$, $R^3$ and $R^4$ respectively are as defined above and may be the same or different.

Compounds represented by formula I-1, supra, may be depicted by the following formulae:

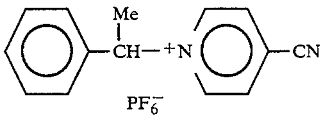

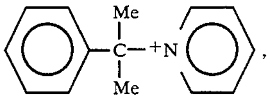

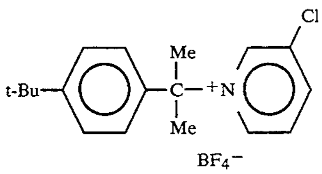

$SbF_6^-$ or 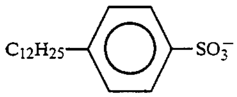

Compounds represented by formula 1-2, supra may be depicted by the following formulae:

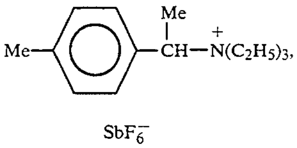

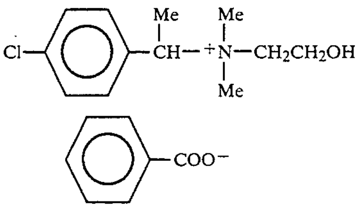

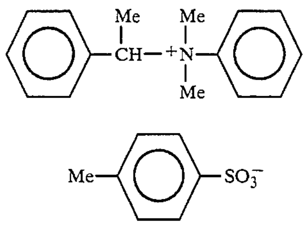

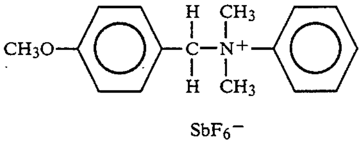

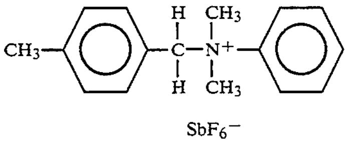

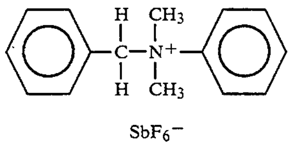

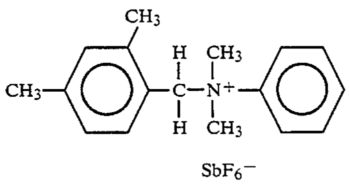

These aromatic ammonium organic acid salts represented by the foregoing formulae (I) can be produced by reacting, eg., a pyridine group or an amine group with benzyl halide, followed by a salt exchange.

Ammonium organic salts depicted by the formulae (II) may also be depicted as follows:

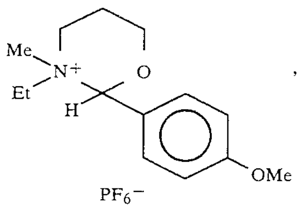
,

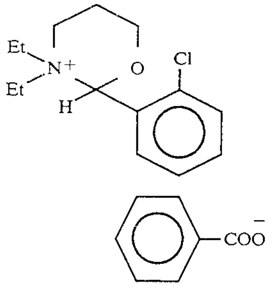

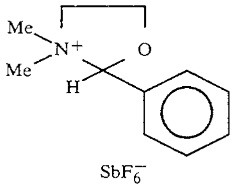
,

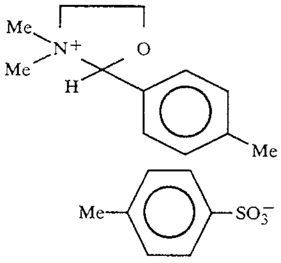

The ammonium organic acid salts represented by the foregoing formula (II) can be produced by acetalizing an aldehyde or ketone with an allylamine as follows:

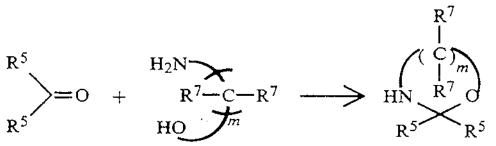

wherein $R^5$, $R^7$ and m are as defined above.

In the next step, the product is reacted with an alkyl halide as follows:

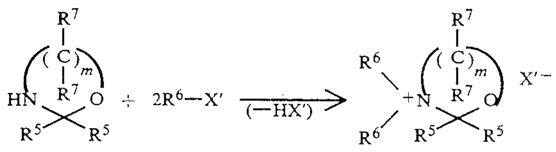

wherein $R^5$, $R^6$, $R^7$, and m are as defined above and X is a halogen atom.

Lastly, the ammonium organic acid salts represented by formula (II) are obtained by a conventional salt exchange process.

The heat activating compounds depicted by formula's (I and II) may be used individually or in combination. The heat activating compound is at least one of I and II. When these compounds are heated at temperatures of from about 60° C. to about 160° C., a carbonium cation is produced, i.e,:

$$R^1—O—^+CH_2,\ (R^2)_3—O—^+C—(R^3)_2,\ \text{or}\ ^+H$$

thereby enabling the electron donating organic compound to develop color. Accordingly, the color developer is an optional component of this invention. However, these compounds are relatively expensive.

When these compounds are used as the color developer, large quantities are required ranging from about 10 to about 50 weight percent of the solid part of the heat sensitive color developing material.

According to a further feature of the invention, when the compounds depicted supra, are combined with a t-butylester group, it is rapidly converted to a carboxylic acid and isobutane.

The carboxylic group causes the tactone ring of the color developing organic compound to open, thereby enabling effective color development.

Accordingly, when the heat activating compound and the compound containing a t-butylester group are present together, color can be developed economically with a small quantity of the heat activating compound.

In addition, by selecting a preferred heat activator, it is possible to control the color developing temperature of the heat sensitive color developing material.

Compound (C) having a t-butylester group as the color developer which can be used in this invention requires a higher boiling point than the temperature by which the heat activating compound (B) is thermally dissolved in the cation. The color developer (C) is preferably selected from a t-butylester of an aliphatic carboxylic acid of 3 to 18 carbon atoms, t-butylester of a carbocyclic carboxylic acid of 6 to 10 carbon atoms, t-butylester of a heterocyclic carboxylic acid of 3 to 6 carbon atoms, and a film forming substance having an average molecular weight of from about 500 to about 50,000 and containing a chain of a t-butylester.

The compounds which contain a t-butylester group of an aliphatic carboxylic acid are preferably at least one selected from the group consisting of a t-butylester group of an alkanoic acid such as t-butylpropionate, t-butylcyanoacetate, t-butylchloroacetate, t-butyl acetoacetate, di-t-butylmalonate, di-t-butyl-1,3-acetondicarboxylate, di-t-butylazipate, di-t-butylazelate, di-t-butylsebacate, and similar compounds, a t-butylester group of an unsaturated aliphatic acid such as di-t-butylacetylenedicarboxylate, and similar compounds.

The compounds which contain a t-butylester group of a carbocyclic carboxylic acid are preferably at least one selected from the group consisting of a t-butylester group of an aromatic acid such as t-butylbenzoate, di-t-butylphthalate, di-t-butylisophthalate, di-t-butylterephthalate, and similar compounds, a t-butylester group of an alicyclic acid such as di-t-butyl-1,2-cyclohexanedicarboxylate, di-t-butyl-1,3-cyclohexanedicarboxylate, di-t-butyl-1,4-cyclohexanedicarboxylate, and similar compounds.

The compounds which contain a t-butylester group of a heterocyclic carboxylic acid are preferably at least one selected from the group consisting of a t-butylester of a hetero aromatic acid such as t-butyl-4-acetyl-3,5-dimethyl-2-pyrolcarboxylate, t-butyl-3,4,5-trimethyl-2-pyrolcarboxylate and similar acids.

The color developer (C), according to this invention, may be a resin compound having a t-butylester group. The average molecular weight of the resin compound is between about 500 to about 50,000. If the molecular weight is less than 500, the resin becomes sticky and loses its ability to form a film. It also is unable to function as a binder.

On the other hand, if the molecular weight of the resin exceeds 50,000, it transforms into a high strength film, whereby the thermal decomposition of the t-butylester is delayed resulting in an inferior color development.

A suitable resin is a single polymer having a t-butylester group, and copolymers thereof such as acrylic acid.

A single polymer having a t-butylester group is at least one of t-butylacrylate, t-butylmethacrylate, t-butylchlotonate, and similar polymers.

The copolymers are produced from at least one of the following comonomers: an ester of acrylic or methacrylic acid, methyl acrylic acid, ethyl acrylic acid, n-propyl acrylic acid, isobutyl acrylic acid, cyclohexyl acrylic acid, 2-ethylhexyl acrylic acid, octyl acrylic acid, 2-ethyloctyl acrylic acid, dodecyl acrylic acid, benzyl acrylic acid, methyl methacrylic acid, ethyl methacrylic acid, n-propyl methacrylic acid, isopropyl methacrylic acid, n-butyl methacrylic acid, isobutyl methacrylic acid, hexyl methacrylic acid, cyclohexyl methacrylic acid, 2-ethylhexyl methacrylic acid, octyl methacrylic acid, 2-ethyloctyl methacrylic acid, benzyl methacrylic acid, dodecyl methacrylic acid, phenyl methacrylic acid, 2-hydroxypropyl methacrylic acid, 2-hydroxyethyl methacrylic acid, 2-hydroxypropyl methacrylic acid, and ester of methacrylic and acrylic acid containing a hydroxyl group.

Other ethylene unsaturated monomers which may be used include dialylester fumaric acid, dialylester itaconic acid, styrene, vinyltoluene, α-methylstyrene, acrylonitrile, methacrylonitrile, acrylamide, methacrylamide, vinyloxazoline, vinyl acetic acid, vinyl propionic acid, laurylvinyl ether, a vinyl mononer containing halogen, a vinyl monomer containing silicon, and similar monomers.

A radical polymer initiator may be used as a polymer initiator. These include, for example, azoisobutylnitrile, benzoyl peroxide, t-butylperoxy-2-ethylhexanoate, and similar iniinators.

A suitable solvent may also be included.

The polymer initiator is generally used in amounts of from about 0.5 to about 10 weight percent based on 100 percent of polymer oriented monomer having t-butoxyphenyl groups, and the copolymer oriented monomer is about 20 to 80 weight percent.

The resin composition may be prepared by conventional techniques wherein the components are mixed together for a predetermined period of time ranging from about 3 to about 8 hours at a temperature of from about 80° to about 120° C.

Further, the color developer according to this invention may be at least one selected from the group consisting of a t-butylester group of an aliphatic carboxylic acid, a t-butylester group of a carboxylic acid, a t-butylester group of a heterocyclic acid and a resin containing a t-butylester group.

Since the heat sensitive color developing material is used in a film form, a film forming macromolecular substance, i.e., binder may also be included in the formulation.

Such a film forming macromolecular substance may be a resin compound containing a t-butylester group. In this case, it is not required to use any specific film forming macromolecular substance. Any suitable macromolecular substance not including any acid radical may be used.

In the situation where the heat sensitive color developing material is, e.g., a heat sensitive recording paper, the macromolecular substance must satisfy the following requirements in view of the high speed recording:

1. To very finely disperse the heat sensitive dye, color developer and similar substances.
2. Attain good thermal conductivity.
3. Easily generate a thermal reaction of the heat sensitive dye and color developer.
4. Attain a desirable melting point.
5. The ability to dissolve in a conventional solvent or water.

There are available, various setting-type heat sensitive recording papers or simultaneously multiple recording paper. The macromolecular substance or binder must also meet these requirements.

Accordingly, the following resins containing t-butylester groups are preferred: carnauba wax, montane acid wax, polysulfoneether, polycarbonate, polyarylate, polystyrene, carboxymethylcellulose, alginic acid and its derivatives, chlorinated paraffin, silicone resin, oxide wax, acrylic resin, and similar substances.

However, any acid radical that reacts with the leuco compound such as carboxylic, sulfonic, phosphoric acid, and similar acid radicals may be contained in the binder.

A suitable solvent or wax may be added to the heat sensitive color developing material.

The heat sensitive color developing material contains from 0.1 to about 30, preferably from about 1 to about 10 weight percent based upon 100 weight percent of the heat activating compound. The color developer is present in amounts of from about 10 to about 70, preferably from about 20 to about 60 weight percent. The film forming macromolecular substance is present in amounts of from about 20 to about 70, preferably from about 30 to about 60 weight percent.

The heat sensitive color developing material may be prepared by conventional methods such as by mixing the components and heating.

The heat sensitive recording paper may be produced by coating from 1 to about 10 $g/m^2$ of the heat sensitive color developing material onto a suitable paper and then drying the same.

EXAMPLES

The following TABLE demonstrates the combination of a color forming organic compound combined with a heat activating compound and color developer, which are identified below, an acrylic resin which is 30 parts methylmethacrylate and 70 parts n-butylmethacrylate having an average molecular weight of about 7100, and 5 weight percent of tetrahydrofuran. These were mixed together prior to use. The compositions so produced were coated onto a good quality paper with a solid portion of 2 to 4 $g/m^2$, thereby producing a color developing compound. The color changing conditions were then observed. The results shown in the TABLE.

The color changing temperature indicates degrees centigrade.

Compounds 1 to 16 (exclusive of Compound No. 4 and Compound No. 5) listed in the TABLE are as follows:

TABLE 1

| | COLOR FORMING ORGANIC COMPOUND (weight part) | HEAT ACTIVATOR (weight part) | COLOR DEVELOPER (weight part) | ACRYLIC RESIN (weight part) | COLOR CHANGE STARTING TEMP. (°C.) COLOR BEFORE HEATING → COLOR AFTER HEATING |
|---|---|---|---|---|---|
| EXAMPLE | | | | | |
| 1 | No. 1 (1.0) | No. 4 (1.0) | — | (5) | colorless —140→ blue |
| 2 | No. 1 (1.0) | No. 5 (0.2) | — | (5) | colorless —90→ blue |
| 3 | No. 1 (1.0) | No. 6 (2.5) | — | (5) | colorless —100→ blue |
| 4 | No. 1 (1.0) | No. 9 (1.0) | — | (5) | colorless —150→ blue |
| 5 | No. 1 (1.0) | No. 10 (1.0) | — | (5) | colorless —120→ blue |
| 6 | No. 1 (1.0) | No. 11 (1.0) | — | (5) | colorless —140→ blue |
| 7 | No. 2 (1.0) | No. 12 (1.0) | — | (5) | colorless —120→ red |
| 8 | No. 3 (1.0) | No. 13 (1.0) | — | (5) | colorless —110→ black |
| 9 | No. 1 (1.0) | No. 4 (0.2) | di-t-butylmalonate (10) | (5) | colorless —140→ blue |
| 10 | No. 1 (1.0) | No. 5 (0.2) | t-butylpropyonate (10) | (5) | colorless —100→ blue |
| 11 | No. 1 (1.0) | No. 6 (0.2) | di-t-butyladipate (10) | (5) | colorless —100→ blue |
| 12 | No. 2 (1.0) | No. 7 (0.2) | di-t-butyladipate (10) | (5) | colorless —120→ red |
| 13 | No. 3 (1.0) | No. 8 (0.2) | di-t-butyladipate (10) | 5 | colorless —110→ black |
| 14 | No. 1 (1.0) | No. 5 (0.2) | No. 14 (20) | — | colorless —110→ blue |
| 15 | No. 1 (1.0) | No. 7 (0.2) | No. 14 (20) | — | colorless —120→ blue |
| 16 | No. 2 (1.0) | No. 9 (0.2) | No. 14 (20.0) | — | colorless —150→ red |
| 17 | No. 3 (1.0) | No. 10 (0.2) | No. 15 (20.0) | — | colorless —120→ black |
| 18 | No. 1 (1.0) | No. 11 (0.2) | No. 15 (20.0) | — | colorless —140→ blue |
| 19 | No. 2 (1.0) | No. 12 (0.2) | No. 14 (20.0) | — | colorless —120→ red |
| 20 | No. 3 (1.0) | No. 13 (0.2) | No. 16 (20) | — | colorless —110→ black |
| COMPARISON | | | | | |
| 1 | No. 1 (1.0) | — | bishpenol A | (5) | when dissolving with a solvent (THF), color was changed to blue |
| 2 | No. 2 (1.0) | — | p-t-butylphenol | (5) | when dissolving with a solvent (THF), color was changed to red |
| 3 | No. 3 (1.0) | — | 4-nitrophenol | (5) | when dissolving with a solvent (THF), color was changed to black |

[(THF) = tetrahydrofuran]
Remarks =
1) methylmethacrylate/n butylmethacrylate = 30/70 copolymer with an average molecular compound of 7100

Compound No. 1: 3-(4-diethylaminophenyl)-3-(1-ethylmethylindole-3-ile) phthalide.

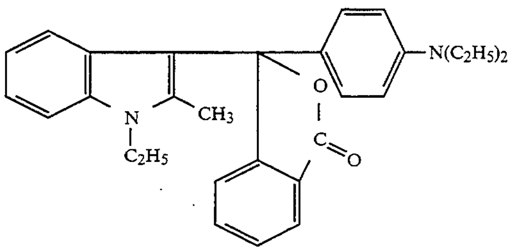

Compound No. 2: 3,3-bis(1-n-butyl-2-methylindole-3-ile) phthalide.

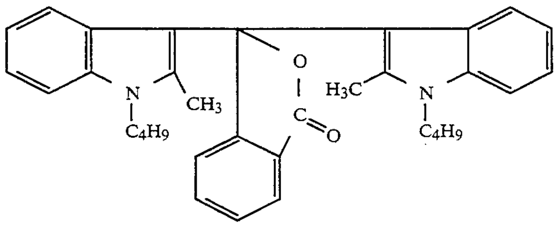

Compound No.3: 3-dibutylamino-6-methyl-7-anilino flouran.

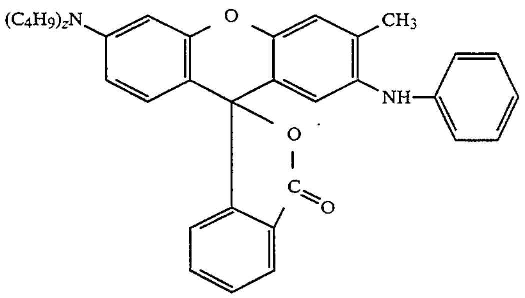

Compound No. 6:

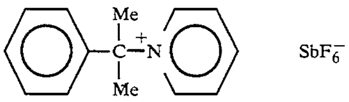

Compound No. 7:

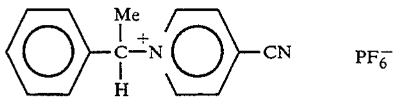

Compound No. 8:

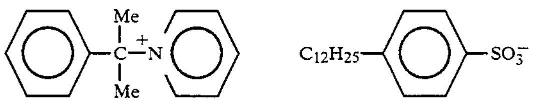

Compound No. 9:

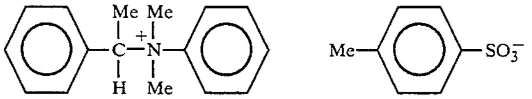

Compound No. 10:

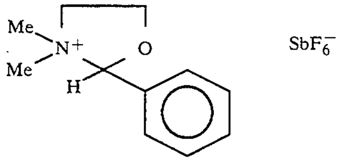

Compound No. 11:

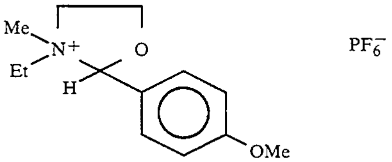

Compound No. 12:

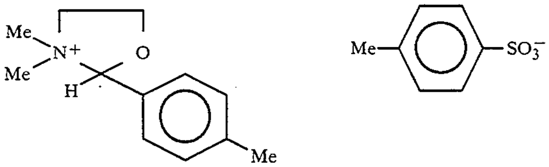

Compound No. 13:

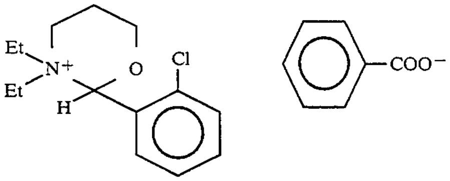

Compound No. 14: a radical copolymer having t-butylacrylate/n-butylmethacrylate in a 50/50 weight ratio, with an average molecular weight of 6,500.

Compound No. 15: a radical copolymer having p-t-butylmethacrylate/n-laurylmethacrylate in a 70/30 weight ratio, with an average molecular weight of 5,200.

Compound No. 16: a radical copolymer having t-butylacrotonate/methylmethacrylate in a 70/30 weight ratio, with an average molecular weight of 6,600.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. A heat sensitive color developing material comprising:

(A) an electron donating color forming organic compound;

(B) a heat activating compound wherein said heat activating compound is selected from the group consisting of compounds I and II:

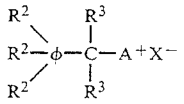

I $R^2$ is independently selected from the group consisting of —H, —CN and Cl, $R^3$ is independently selected from the group consisting of H, —R, halogen atom and methyl, A is selected from the group consisting of

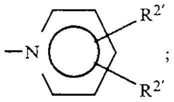
;
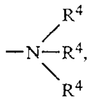
, and
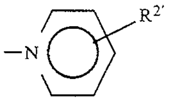

$R^{2'}$ is selected from the group consisting of H, CN, and Cl, $R^3$ is methyl,

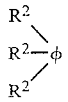

is selected from the group consisting of

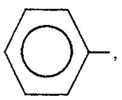
,
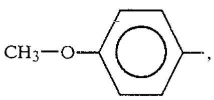
,
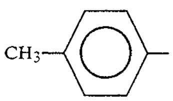
and

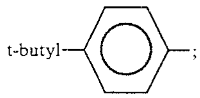
;

$R^4$ is independently selected from the group consisting of alkyl, alkenyl, and alkenyl substituted by a group selected from the group consisting of hydroxy, carboxy, nitro, cyano, alkoxy of 1-4 carbon atoms, alkanoyloxy of 1 to 4 carbon atoms, phenyl, and phenyl substituted by a group selected from the group consisting of halogen, nitro, cyano, $—NR^2$, —R, and —OR, R is selected from the group consisting of an alkyl radical of 1 to 4 carbon atoms and a cycloalkyl radical, R′ is selected from the group consisting of H, —R, —OR, a halogen atom and a nitro group, X includes at least one member selected from the group consisting of $AsF_6^-$, $SbF_6^-$, $BF_4^-$, $BF_6^-$, $PF_6^-$, $ClO_4$, $FeCl_4^-$, $CF_3SO_3^-$, $RSO_3^-$, and RCOO—;

II

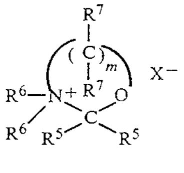

$R^5$ is independently selected from the group consisting of H, —R, an alkenyl radical of 2 to 3 carbon atoms and $R^8$, $R^6$ is independently selected from the group consisting of —R, an alkenyl radical of 2 to 3 carbon atoms and $R^8$, $R^7$ is independently selected from the group consisting of H, OH, —R, —OR, and $—R^8$, $—R^8$ includes at least one member selected from the group consisting of a phenyl radical, and a phenyl radical substituted by a group selected from the group consisting of a halogen atom, hydroxy, nitro, cyano, —NHR, —R, and —OR, m is an integer of 1 to 4 and R and X are as defined above.

2. The heat sensitive color developing material of claim 1, further comprising:

a color developer (C);

said color developer includes a compound of t-butylester radical; and said t-butylester radical is selected from the group consisting of a t-butylester of aliphatic carboxylic acid of 3 to 18 carbon atoms and having a higher boiling point than the thermal decomposition temperature of said heat activating compound (B), t-butylester of a carboxylic acid of 6 to 10 carbon atoms, t-butylester of a heterocyclic carboxylic acid of 3 to 6 carbon atoms, and a film forming macromolecular substance having an average molecular weight of 500 to about 50,000 and containing a t-butylester side chain.

3. The heat sensitive color developing material of claim 1, wherein A is

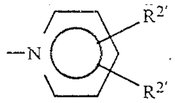
.

4. A heat sensitive color developing material as defined in claim 1, wherein the heat activating compound comprises:

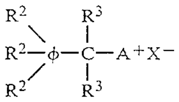

I wherein A is selected from the group consisting of:

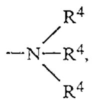
,
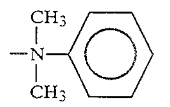
and

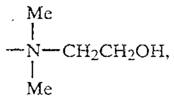
, $R_3$ is H or a methyl group and

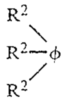
is
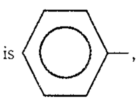
,
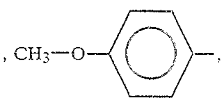
,

-continued

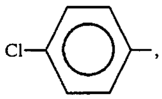, 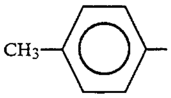 and

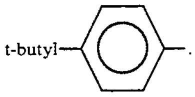.

5. A heat sensitive color developing material as defined in claim 1, wherein the heat activating compound comprises a compound having the following formula:

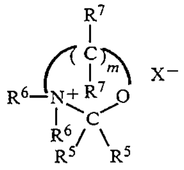

II wherein m is an integer;

said integer being one of a 2 and a 3;

$R^6$ is selected from the group consisting of methyl and ethyl;

$R^7$ is H;

one $R^5$ is H;

an other $R^5$ is selected from the group consisting of:

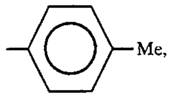, 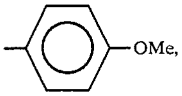,

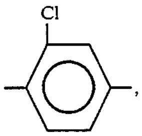, and 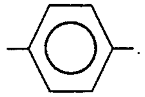.

6. A heat sensitive color developing material as defined in claim 2, wherein the heat activating compound comprises:

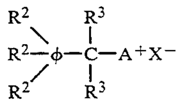

I wherein A is selected from the group consisting of

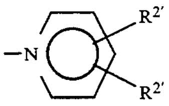 and 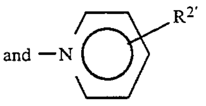

$R^{2'}$ is selected front the group consisting of H, CN, and Cl;

$R^3$ is methyl; and

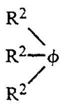

is selected from the group consisting of

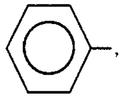, 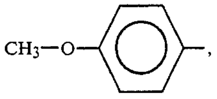,

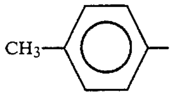 and 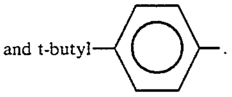.

7. A heat sensitive color developing material as defined in claim 2, wherein the heat activating material comprises:

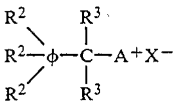

I wherein A is selected from the group consisting of:

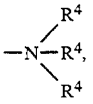, 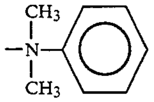, and

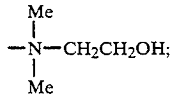;

$R^3$ is selected from the group consisting of H and a methyl group; and

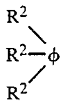

is selected from the group consisting of

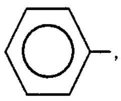, 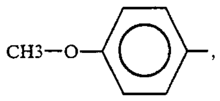,

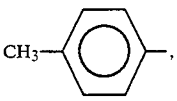, and 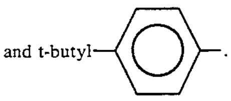.

8. A heat sensitive color developing material as defined in claim 2, wherein said heat activating material comprises a compound of the following formula:

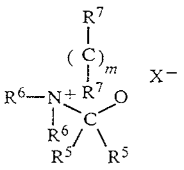

II wherein m is an integer;

said integer being one of a 2 and a 3;

$R^6$ is selected from the group consisting of methyl and ethyl;

$R^7$ is H;

one $R^5$ is H; and an other $R^5$ is selected from the group consisting of:

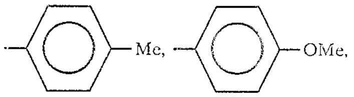

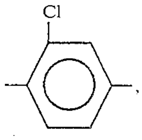

, and

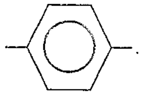

9. A heat sensitive recording paper wherein said heat sensitive color developing material of claim 1 is coated thereon to a thickness of from about 1 to about 10 g/$m_2$.

10. A heat sensitive recording paper wherein said heat sensitive color developing material of claim 2 is coated thereon to a thickness of from about 1 to about 10 g/$m_2$.

11. The heat sensitive color developing material according to claim 1, wherein only one $R^3$ is H.

12. The heat sensitive color developing material according to claim 1, wherein $R^3$ is methyl.

13. The heat sensitive color developing material according to claim 6, wherein only one $R^3$ is methyl.

* * * * *